G. FRENKEL.
METHOD OF MANUFACTURING LINOLEUM MOSAIC.
APPLICATION FILED NOV. 2, 1909.
1,126,440.
Patented Jan. 26, 1915.
6 SHEETS—SHEET 1.
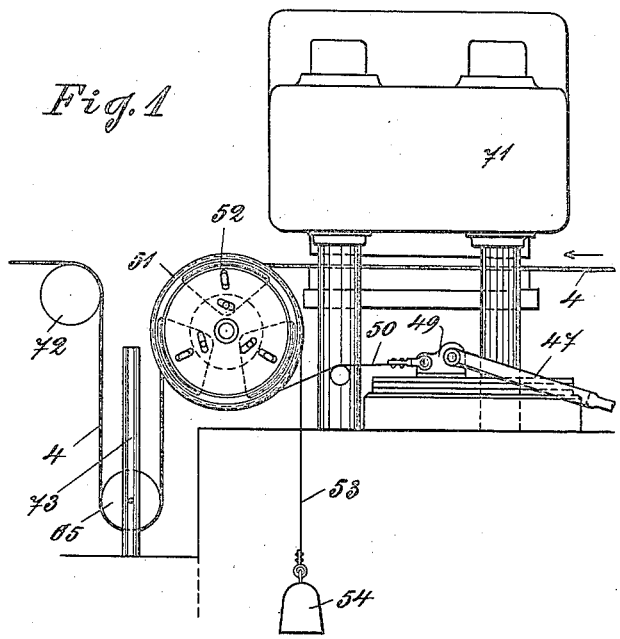
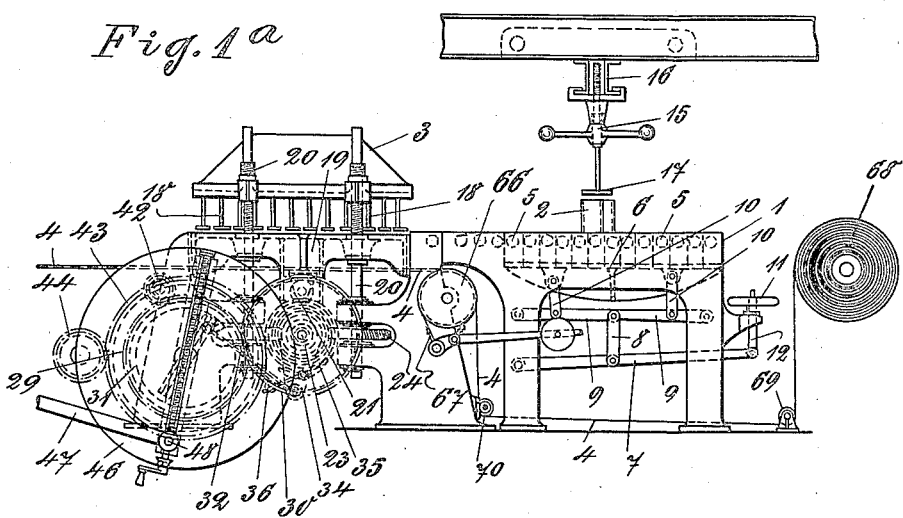
Witnesses:
Jas. T. McCathran
J. H. Siggers
Gustav Frenkel, Inventor:
By E. G. Siggers
atty.

G. FRENKEL.
METHOD OF MANUFACTURING LINOLEUM MOSAIC.
APPLICATION FILED NOV. 2, 1909.
1,126,440.
Patented Jan. 26, 1915.
6 SHEETS—SHEET 2.
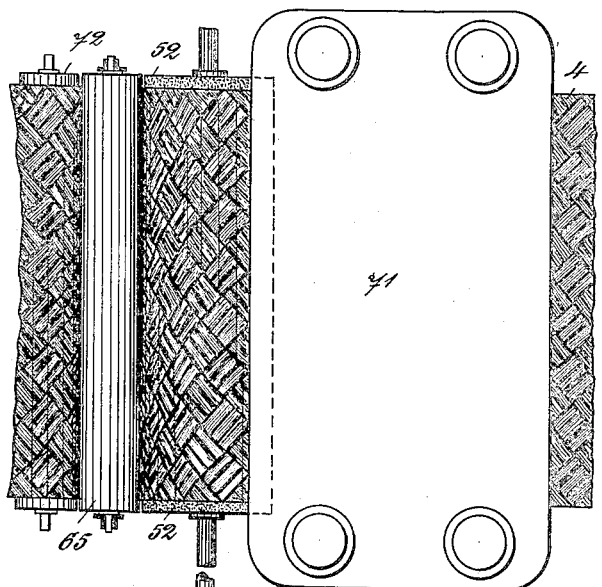
Fig. 2.
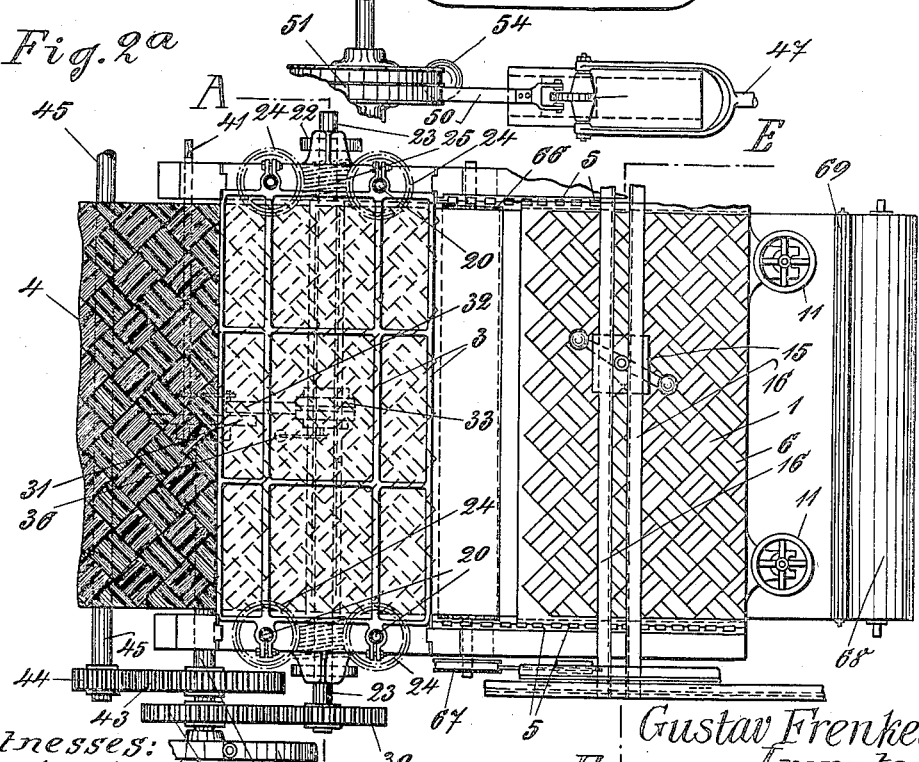
Fig. 2ª
Witnesses:
Gustav Frenkel, Inventor.

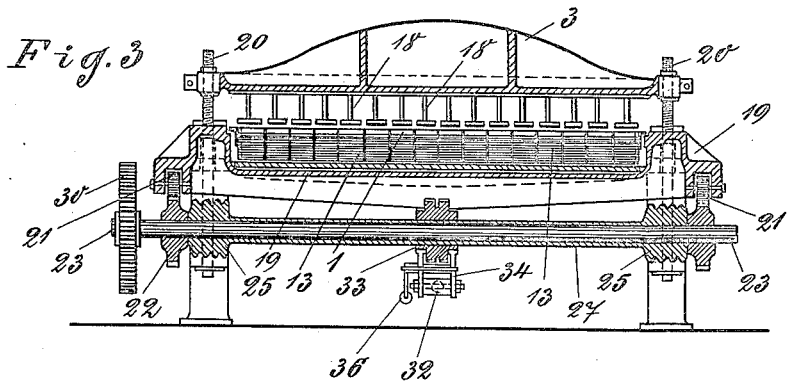
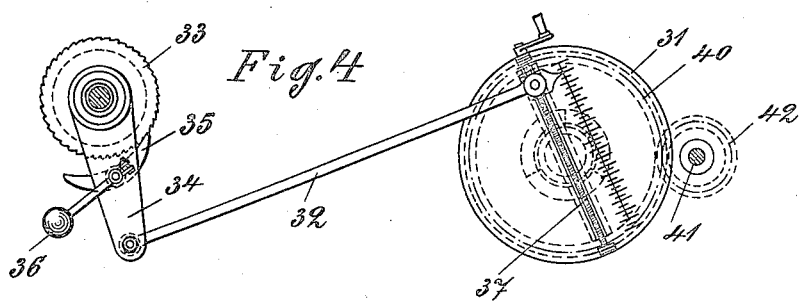
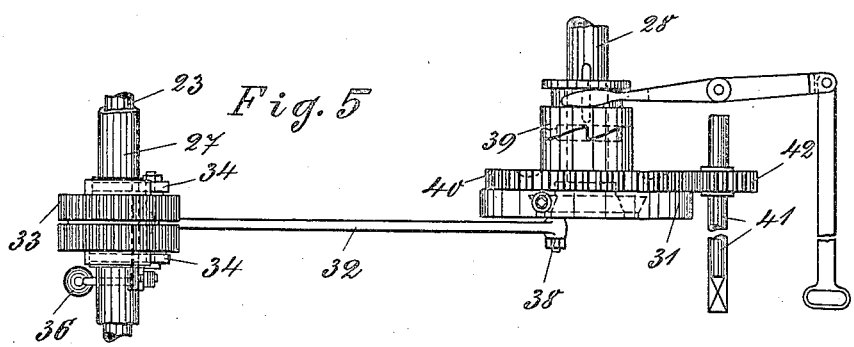
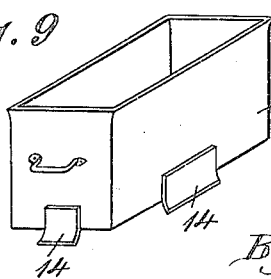

G. FRENKEL.
METHOD OF MANUFACTURING LINOLEUM MOSAIC.
APPLICATION FILED NOV. 2, 1909.
1,126,440.
Patented Jan. 26, 1915.
6 SHEETS—SHEET 4.
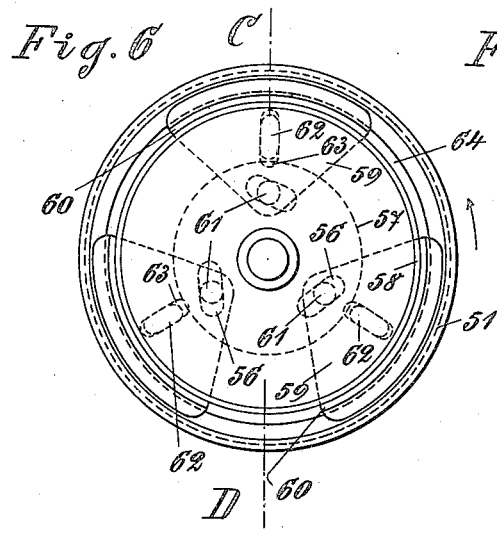
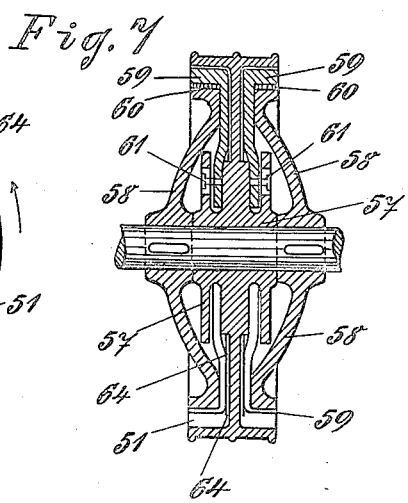
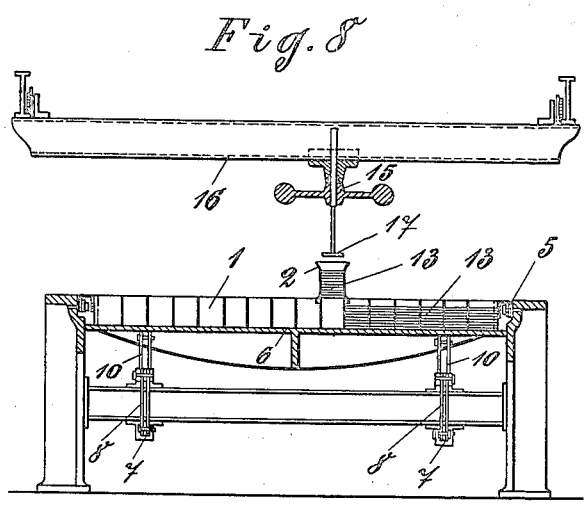
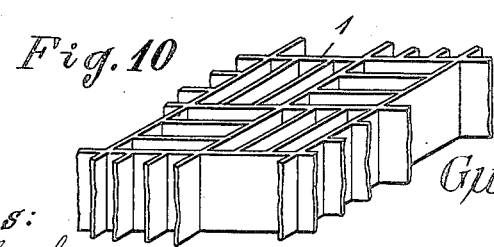
Witnesses:
Jas. K. McCathran
J. A. Siggers
Gustav Frenkel,
Inventor:
By E. G. Siggers
atty.

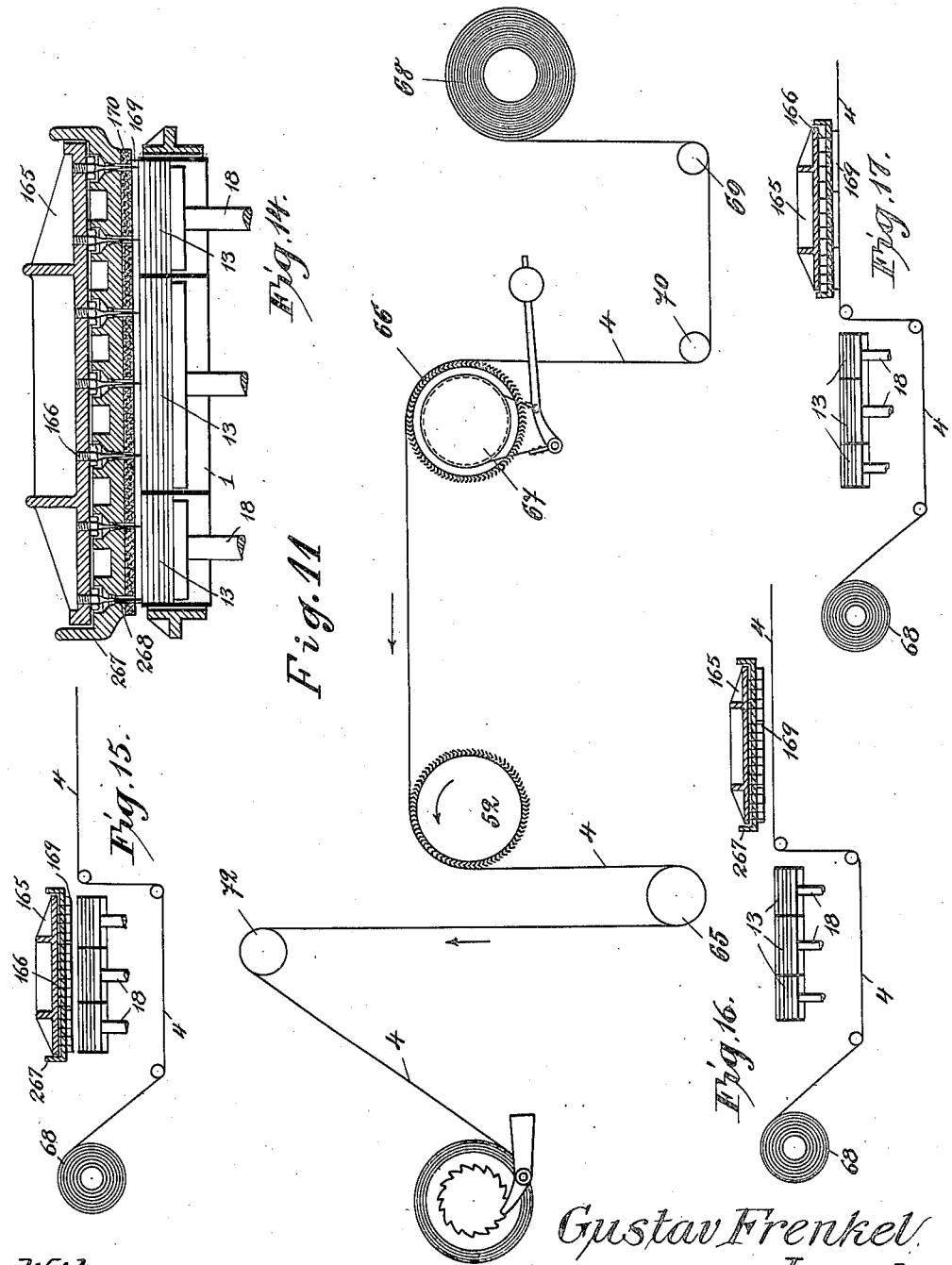

G. FRENKEL.
METHOD OF MANUFACTURING LINOLEUM MOSAIC.
APPLICATION FILED NOV. 2, 1909.
1,126,440.
Patented Jan. 26, 1915.
6 SHEETS—SHEET 6.
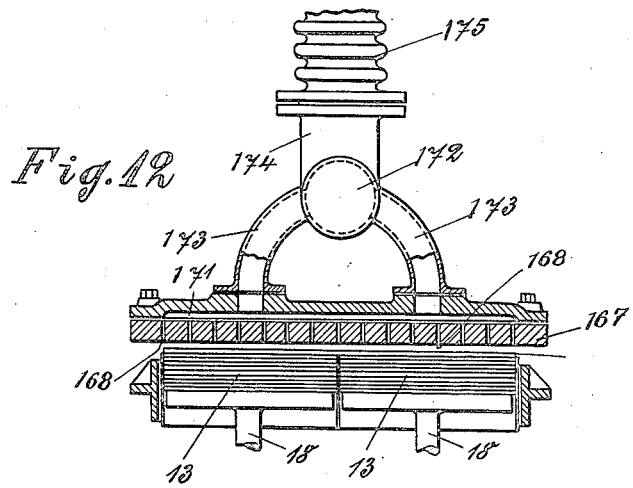
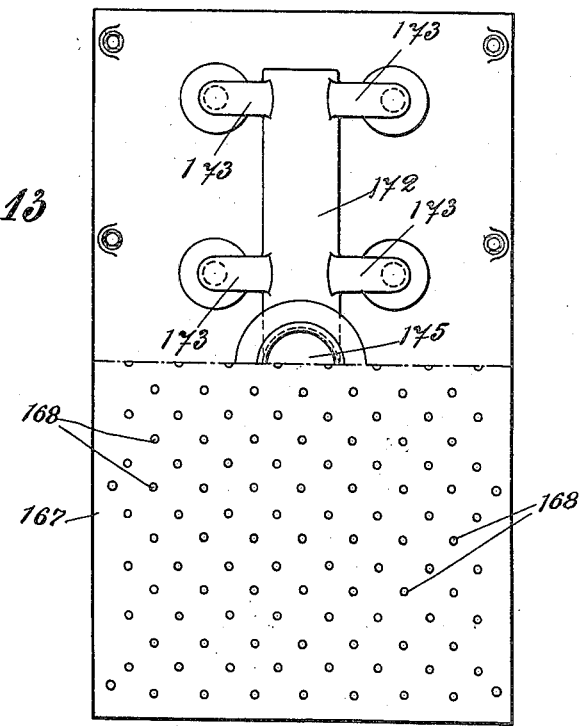
Witnesses:
Gustav Frenkel, Inventor:

UNITED STATES PATENT OFFICE.

GUSTAV FRENKEL, OF DELMENHORST, GERMANY, ASSIGNOR TO ARMSTRONG CORK COMPANY, OF PITTSBURGH, PENNSYLVANIA, A CORPORATION OF PENNSYLVANIA.

METHOD OF MANUFACTURING LINOLEUM MOSAIC.

1,126,440. Specification of Letters Patent. Patented Jan. 26, 1915.

Application filed November 2, 1909. Serial No. 525,913.

*To all whom it may concern:*

Be it known that I, GUSTAV FRENKEL, engineer, subject of the German Emperor, residing at Delmenhorst, in the Grand Duchy of Oldenburg, have invented a new and useful Improvement for Method of Manufacturing Linoleum Mosaic, of which the following is a specification.

The present invention relates to a process for manufacturing linoleum mosaic and the invention is based on the utilization of the elasticity of the linoleum pulp, whereby it is rendered possible to place the individual pieces of linoleum at the same time in close juxtaposition on a supporting fabric in such a way that the hitherto customary joints which were due to the walls of a mold or to inexact placing are avoided. The figure-pieces which from the commencement are cut or stamped somewhat larger than their size in the finished design expand, in consequence of the elasticity of the linoleum pulp after leaving a mold in which they were previously compressed, and close together with lateral pressure, so that during the subsequent pressing operation a firm and intimate connection of the individual pieces is obtained. Without providing the side walls of the individual figure-pieces or the fabric previously with an adhesive substance, a linoleum can, according to the present invention, be produced in the case of which the web composed of figure-pieces does not break at the joints of the figure-pieces as was the case with the linoleum mosaic hitherto manufactured from individual pieces.

According to the present invention, the individual figure-pieces of the linoleum material are placed in boxes from which they are pressed by means of spindle or lever presses into a mold movable in a horizontal frame. Or the figure-pieces are piled up side by side in a fixed mold capable of being taken to pieces and the mold is then screwed together, the figure-pieces becoming likewise easily compressed. The compression effects two objects, viz., firstly the figure-pieces are held firmly in the mold by the friction at the walls of the latter and can be removed again only by being pressed out of the same, and secondly, the pressing or compressing operation readily effects the compression of the figure-pieces, so that after leaving the mold they expand again in consequence of their elasticity, and in this manner close the fine joints due to the mold or to being unequally laid. After the mold is filled the latter is either run under a pressure-plate provided with stamps, which pressure-plate from time to time presses a layer of the pieces simultaneously from above on to a supporting fabric or the stamps press the figure-pieces from below out of the mold which in this case is fixed, whereupon the layer of figure-pieces left free by the mold is lifted off by suitable devices and is placed on a fabric after the latter has been fed forward by an amount corresponding to the linoleum material which has been applied.

In the drawings:—Figure 1 represents in side elevation one portion of a machine for carrying out the present process. Fig. 1ª is a similar view of the other portion of the machine. Fig. 2 is a plan view of that portion of the machine shown in Fig. 1. Fig. 2ª is a similar view of that portion of the machine illustrated in Fig. 1ª. Fig. 3 is a cross-section through the machine on the line A—B, Fig. 2ª. Figs. 4, 5, 6, 7, 9 and 10 show details. Fig. 8 illustrates a cross-section through a charging device on the line E—F (Fig. 2ª). Fig. 11 represents diagrammatically the guides for the supporting fabric, while Figs. 12 and 13 represent a suction delivering device, and Figs. 14, 15, 16 and 17 a delivery device provided with spikes, or the like.

When using a horizontally movable mold from which the figure-pieces are forced out from above downward on to a fabric, the mold 1 resting on the rollers 5 is first brought above the table-plate 6 and the latter is raised up to the mold by the lever-mechanism 7, 8, 9, 10 (Fig. 1ª) with the aid of the screwed spindles 12 (Figs. 1ª and 2ª) provided with the hand-wheels 11, so that the mold rests perfectly on the table-plate. Then a charging-box 2—of which several may be present—is brought on to the mold 1 with the figure-pieces 13 (Fig. 8) situated therein. The box keeps its exact position with regard to the mold by means of the pieces 14 (Fig. 9) on said box. The figure-pieces 13 are forced into this box 2 either directly by means of a stamp or the box is charged by hand, in such a way that the figure-pieces are piled one above another to the requisite number and the box is then reversed and forced over the same. The upper edges of the box are splayed outward slightly which prevents the figure-pieces from becoming injured. A press—in the drawing a screw-press—15 (Figs. 1, 2 and 8) which is displaceably arranged on a traveling cross-beam 16 forces the figure-pieces 13 out of the box 2 into the mold 1. Fig. 8 illustrates this operation. The traveling cross-beam enables each point of the mold to be reached. Moreover the plate 17 of the stamp is exchangeable so that it may correspond with the figure-pieces being applied at the time. When the operation of charging the mold 1 is ended the latter passes under a pressure-plate 3, provided with exchangeable stamps 18 (Figs. 1 and 3).

The pressing of the figure-pieces 13 out of the mold 1 on to a supporting fabric is effected in the following manner:—By turning the screw-spindles 20 (Figs. 1ᵃ and 3) which engage with their upper thread-portions in the pressure-plate 3 and at the same time serve as supporting columns for this plate, the spindles 18 are first of all lowered until they touch the figure-pieces 13 situated in the mold. A cross-beam 19 (Figs. 1ᵃ and 3) which is movable in a vertical direction and on which the mold 1 rests and which supports at each side a roller 21, is reciprocated up and down by means of two cam disks 22 which engage with the rollers 21 and which are fixed on the shaft 23. The screw-spindles 20 are so connected with the cross-beam 19 that they turn in the cross-beam but can not be shifted. The screw-spindles 20 are driven by worm-gears, the worm-wheels 24 (Figs. 1 and 2) of which are so supported that the screw-spindles 20 on the cross-beam 19 being raised and lowered can shift in the same, the rotation being transmitted by inserted keys. The worms 25 which engage in the worm-wheels 24 are rigidly connected with a hollow shaft 27 (Fig. 3). This hollow shaft is pushed loosely over the shaft 23. The shaft 28 (Fig. 2ᵃ) is connected with the shaft 23, the rotation of which shaft 28 is transmitted by the toothed-wheels 29, 30 to the shaft 23. On one end of the shaft 28 a crank disk 31 (Figs. 1ᵃ and 2ᵃ) is arranged which is connected by means of a rod 32 with a pawl and ratchet mechanism fixed on the hollow shaft 27. Figs. 4 and 5 show this device to an enlarged scale.

33 is a double ratchet-wheel provided with teeth facing opposite directions on the nave of which wheel the levers 34 are revolubly arranged. On the free ends of these levers the rod 32 is pivoted. Between the levers 34 is mounted a double pawl 35, the operative portions of which work in different planes, and which supports a weight 36 on its extended axle.

In order to be able suitably to set the pawl and ratchet mechanism the crank disk 31 is provided with a screw-spindle 37 by the rotation of which the crank-pin 38 carrying the rod 32 can be displaced. A scale on the crank-disk shows exactly the magnitude of the stroke, and the crank-disk 31 loosely mounted on the shaft 28 can be coupled with this shaft by means of a coupling 39 which can be uncoupled. The crank-disk 31 is provided behind with a toothed flange 40 with which a toothed-wheel 42 mounted on the shaft 41 engages. The shaft 28 is driven by means of the pair of wheels 43, 44 from the driving shaft 45. After, by the rotation of the shaft 41 (the coupling 39, Fig. 5, having been uncoupled), the stamps 18 (Figs. 1 and 3) have been lowered to such an extent by means of the above-described pawl and ratchet-mechanism that they touch the figure-pieces 13 in the mold 1, the coupling 39 is again coupled up and the pawl 35 is changed over by turning over the weight 36. The shafts 28, 23 (Figs. 1ᵃ and 2ᵃ) which rotate at the same speed are now set in motion by the driving shaft 45, so that the cam-disks 22 on the shaft 23 first of all lower the mold 1 until its distance from the supporting fabric 4 corresponds to the thickness of one layer of the linoleum material. On further rotation occurring, during which the cam-disks hold the mold in its position, the hollow shaft 27 with the worms 25 is set in rotation by the crank-disk 31 and the pawl and ratchet-mechanism in consequence of which the screw-spindles 20 force the stamps 18 to such a distance into the mold 1 that the lowermost layer of the figure-pieces 13 is free of the mold and passes on to the supporting fabric. On the rotation continuing the cam-disks 22 engage the rollers 21 (Figs. 1ᵃ and 3) and raise again the mold together with the stamps which retain their position relatively to the mold. After the supporting fabric 4 has been fed forward again the mold 1 sinks again with the stamps which also still retain their position relatively to the mold. The stamps are then forced farther into the mold and the next layer of figure-pieces passes on to the fabric. This mode of operation is, however, applicable only when it is a matter of dealing with fairly small figure-pieces of ordinary size. If the figure-pieces on the contrary are of extraordinary size they cannot be simply pressed from above downward out of the mold on to the fabric. Such figure-pieces would sag on account of their stability being no longer sufficient and this would result in their easily falling out of the mold. In this case the figure-pieces instead of being pressed from above downward on to a fabric must be pressed from below upward out of the mold, so that the layer passing out of the mold can be removed by suitable devices and be brought on to a fabric. In this case consequently the stamps 18 would not be lowered from above downward into the mold 1 but they would penetrate from below into the mold 1 and they would push a layer of figure-pieces upward out of the mold. The removal of this layer can be effected either by spikes or the like or by means of suction. When the removal is effected by means of spikes or the like a plate 165 (Fig. 14) is situated over the mold 1, which plate throughout its entire length and breadth is fitted on the surface turned toward the mold 1 with needles 166 which pass through a second plate 267 having corresponding holes 268. These two plates are arranged both vertically and horizontally movable. After the uppermost layer of figure-pieces 169 has been pressed by the stamps 18 out of the mold, the two plates 165 and 267 sink simultaneously on to the figure-pieces (Fig. 14) so that the needles 166 penetrate into said pieces. When the two plates are subsequently raised the figure-pieces remain suspended on the needles (Fig. 15) and are pushed together with the plates in a horizontal direction over the fabric 4 (Fig. 16) and then deposited. During this operation the two plates first sink until the figure-pieces 169 adhering to the needles touch the fabric (Fig. 17) the lower plate 267 provided with an elastic layer 170 (cork, rubber or the like) resting on the figure-pieces. The elastic-layer prevents on the one hand the superimposed figure-pieces from being too severely pressed while being removed, and on the other hand the elastic layer cleans the needles from any particles of material possibly adhering to them, which is a matter of great importance. The upper plate 165 is now raised until the needles are out of the figure-pieces while the lower plate 267 remains resting on the figure-pieces. Then the two plates are raised together—the figure-pieces remain lying on the fabric—and are brought back in a horizontal direction over the mold 1 and are lowered on to the second layer of figure-pieces which has been meanwhile forced out of the mold and so on.

The removal of the figure-pieces by means of suction is effected in the following manner:—Above the perforated plate 167 an airtight space 171 (Fig. 12) is so arranged that it incloses the plate 167 throughout its entire length and breadth. Into this space open branch-pipes 173 connected with a main 172 which are so arranged that they are uniformly distributed over the plate 167 (Fig. 3). With a union 174 on the main 172 a flexible metallic hose 175 is connected which is connected with a suction apparatus. The flexible metallic hose permits the plate 167 with the suction-pipes to move upward and downward and also a movement in a horizontal direction. Before the plate 167 is set down on the figure-pieces the suction action at this plate is done away with by opening the main 172 or in any other manner. The plate 167 now descends on to the figure-pieces, and the suction action is produced, whereupon the plate rises with the upper layer of figure-pieces. The suction-holes 68 are uniformly distributed close together over the whole plate 167 as shown in Fig. 13. This arrangement makes it possible to raise by means of one and the same plate each layer of figures without regard to composition and design. After raising the plate 167 the further operation is the same as that represented in Figs. 15, 16 and 17. Whether the figure-pieces are removed from the compartments of the mold 1 by the plungers, or by suction, or by the spikes or pins, the expansive action of the previously compressed linoleum is the same, and this expansion prevents any spaces or openings at the edges of the figure-pieces, which expand and contact with one another as soon as they leave the compartments of the mold 1. The figure-pieces lie close together on the surface of the supporting or following layer, and after they have been conveyed to and placed on the fabric by either the spikes or pins, they will remain in their relative positions owing to the rough surface of the fabric, which consists of jute or other suitable material. If the pieces are placed on the fabric by suction, the process is the same as with the needles, the suction being interrupted after the figure-pieces have been deposited on the fabric.

When the process is applied in the manner indicated in Figs. 12 to 17 the mold 1 can be so supported that the thin intermediate walls can be dispensed with. In that case the figure-pieces do not require to be first pressed into the boxes 2 but they may be placed in layers in the stamp-plates and be immediately pushed from below into the mold situated above, or the mold be pressed over the same. The mold may also be opened by removing one or several walls, and the figure-pieces piled on one another be inserted, the stamp plates forming the bottom of the mold and the figure-pieces being readily compressed by drawing together the walls by means of screws or the like, whereupon the stamps press the figure-pieces in layers from below upward out of the mold. The forward motion of the supporting-fabric is effected by a second crank-disk 46 which in construction corresponds with the crank-disk 31 and is mounted firmly on the same shaft 28. The rod 47 (Figs. 1 and 1ᵃ and Figs. 2 and 2ᵃ) which on the one hand engages with the crank-pin 48 and on the other hand is revolubly fastened to a slide-shoe 49 gives to the latter the reciprocating movements. A steel band 50 likewise engaging with the slide-shoe 49 transmits this motion to the casing 51 of a friction coupling which is arranged on the axle of a needle roller 52 serving to draw forward the supporting-fabric 4. A second steel band 53 carries at its free end a weight 54 which serves on the one hand to move back the casing 51 and on the other hand render non-injurious the slight shocks which occur. In Figs. 6 and 7 the friction coupling is represented to an enlarged scale. The casing 51 loosely mounted on the axle carries on its nave two flanges 57 provided with slots 56 (Fig. 6). The rim of this case is adapted to receive on its outer surface the steel bands 50, 53. On each side of the case 51 a driving disk 58 is firmly connected with the axle and projects at its circumference into the case. The cheeks 59 fit the circumference of the driving disk 58 and are provided on their friction surfaces with a leather facing 60. At their ends facing the axle the cheeks are provided with rollers 61 which engage in the slots 56 of the flanges 57. The cheeks 59 are guided by means of cast projections 62 which engage in slots 63 in the disk 64. These disks are loose on the nave of the case. When the case 51 rotates in the direction of the arrow (Fig. 6) the cheeks 59 are drawn together by means of the slots 56 and are applied firmly against the driving disks 58. When rotating in the opposite direction the cheeks move apart, their movements being limited by the internal surface of the rim of the casing. This arrangement enables any desired magnitude of feed movement to be obtained, so that designs can be carried out with repetition at any desired intervals.

The supporting fabric is guided and stretched by means of a weighted roller 65 (Figs. 1 and 2) and a needle-roller 66 which is provided with a brake 67. The supporting-fabric 4 is guided from the roll 68 over the guide rollers 69, 70 and the needle roller 66, under the mold 1 and a flat hydraulic press 71, and over the needle roller 52, after which it loops around the weight-roller 65 and passes over the guide roller 72 to a winding-up device which, however, is not intended to be the subject-matter of the present invention. The thorough union of the figure-pieces with each other and with the fabric takes place under the heated presses in the well known manner. The weight-roller 65, the weight of which is equal to double the tension of the supporting-fabric 4 is suspended freely in this fabric and is guided in slots 73 at its two ends in order that it may not oscillate. This arrangement insures the supporting-fabric having always a constant tension as the needles of the feed-roller 52 (Fig. 11) are so set, that they cannot take up the pull exerted by the weight-roller 65 on the fabric, whereas the needles of the roller 66 grasp the fabric. The brake 67 (Figs. 1ª, 2ª and 11) however, prevents the needle-roller 66 from rotating merely under the tension due to the weight-roller 65 because said brake balances the tension due to the weight of the roller 65. The forward motion of the supporting-fabric 4 in the direction of the arrow (Figs. 1 and 11) is consequently possible only by turning the feeding needle-roller 52 (Figs. 2 and 11).

In practice it is to be recommended to use two molds 1 instead of one, so that the second mold can be charged by the workman while the machine is emptying the first mold.

What I claim as my invention and desire to secure by Letters Patent is:—

1. The herein described process of making linoleum mosaic, which consists in arranging within a receptacle the figure-pieces forming the linoleum mosaic in a somewhat compressed condition in a plurality of layers, and in simultaneously removing the figure-pieces of a layer from the receptacle so as to permit the figure-pieces to expand and contact with one another.

2. The herein described process of making linoleum mosaic, which consists in making the figure-pieces forming the linoleum mosaic somewhat larger than the size in the finished design, arranging the figure-pieces in a compressed condition within a receptacle, and simultaneously removing the figure-pieces from the receptacle to permit them to expand and contact at the edges.

3. The herein described process of making linoleum mosaic, which consists in making the figure-pieces forming the linoleum mosaic somewhat larger than the size in the finished design, arranging the figure-pieces one above another in a plurality of layers within a mold in a somewhat compressed condition, and forcibly removing the figure-pieces in layers to permit the said figure-pieces to expand and contact at the edges.

4. The herein described process of making linoleum mosaic, which consists in making the figure-pieces forming the linoleum mosaic somewhat larger than the size in the finished design, arranging the figure-pieces in a somewhat compressed condition within separate compartments of a receptacle, removing the figure-pieces from the receptacle in layers and permitting the figure-pieces of a layer to expand and contact at the edges, depositing the figure-pieces upon a supporting fabric, and uniting the figure-pieces with each other and the fabric.

In testimony, that I claim the foregoing as my own, I have hereto affixed my signature in the presence of two witnesses.

GUSTAV FRENKEL.

Witnesses:
 FRIEDRICH SCHMIDT,
 FREDERICK HOYERMANN.